March 5, 1935.  C. E. REEVES  1,993,115
STARTING SWITCH FOR MOTOR VEHICLES
Filed Oct. 18, 1929  2 Sheets-Sheet 1
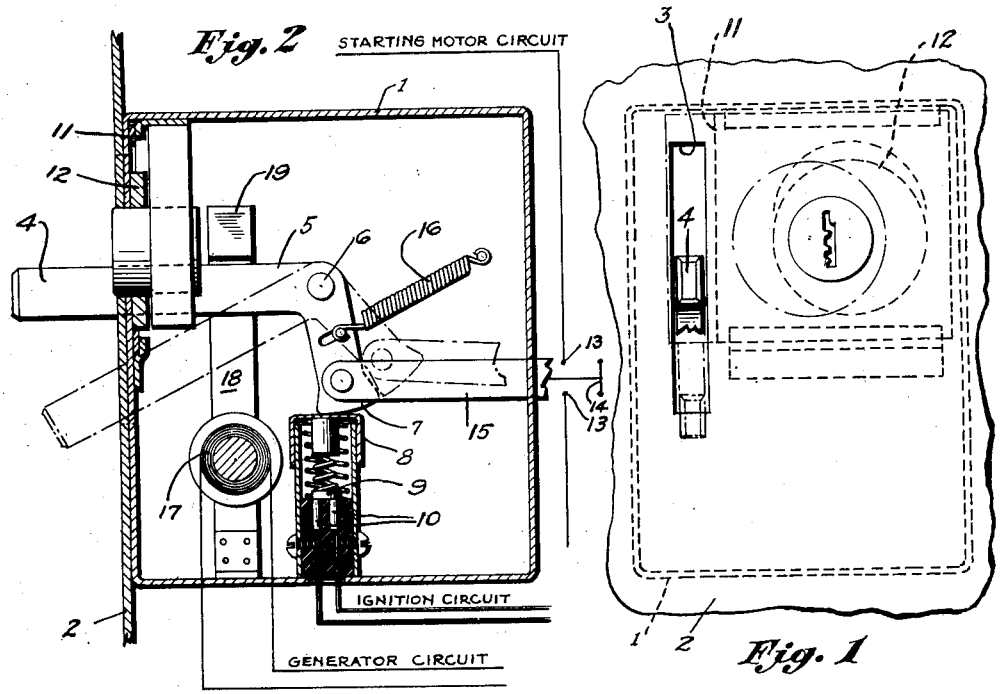
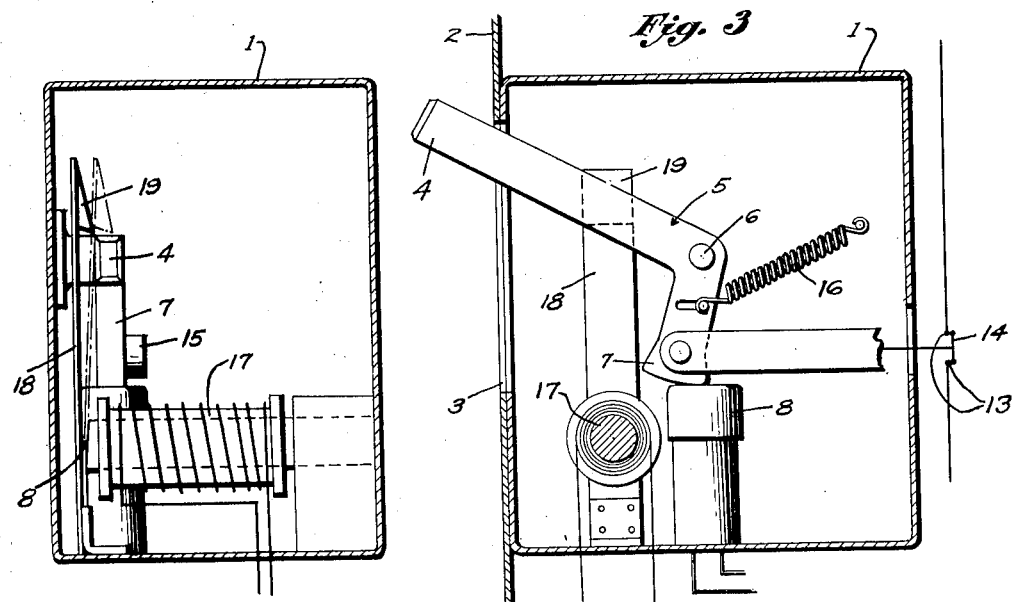
Inventor
Cuthbert E. Reeves
by Barton A. Beau
Attorney March 5, 1935.  C. E. REEVES  1,993,115
STARTING SWITCH FOR MOTOR VEHICLES
Filed Oct. 18, 1929   2 Sheets-Sheet 2

Cuthbert E. Reeves, Inventor
by Barton A. Bean Jr.
Attorney

Patented Mar. 5, 1935

1,993,115

UNITED STATES PATENT OFFICE 1,993,115

STARTING SWITCH FOR MOTOR VEHICLES

Cuthbert E. Reeves, Buffalo, N. Y.

Application October 18, 1929, Serial No. 400,637

2 Claims. (Cl. 290—37)

This invention relates to the starting circuit of internal combustion engines and primarily has reference to a starting circuit which is protected against unauthorized or accidental closing while the engine is in motion.

It has been the practice to equip a motor vehicle with a starting system which is designed to be closed by a switch-controlled circuit through a pedal or foot button mounted on the floor of the car. With a quiet running engine and the vehicle at rest the motorist at times is in doubt as to whether or not his engine is running, and thinking that the engine may have stopped, will push on the starter pedal or button in an attempt to re-start his engine. Under such circumstances, when the engine is running at the time the starter pedal is depressed, it frequently happens that considerable damage is done to the motor plant, such as the stripping of gears, and the motorist thereby is not only subjected to the inconvenience of further delay but also the item of expense which is considerable. Furthermore, with the starter pedal exposed in the various makes of automobiles, a passenger may accidentally place his foot upon the pedal, or even place his luggage on the same, so as to accidentally depress the same while the engine is running. Various other disadvantages to the exposed and unprotected starter switch emphasize the importance of protecting the starter circuit so as to avoid its unauthorized operation at times when the engine is in motion.

The present invention primarily has for its object to eliminate the operation of the starter circuit at times other than when the engine is at rest. More particularly, the invention resides in the provision of an interlocking switch included in the starter system and operative to thwart the operative closing of the starter circuit while the engine is operating.

The invention will further be found to reside in the salient features of construction and their arrangements and combinations of parts hereinafter more fully described and claimed reference being had to the accompanying drawings wherein Fig. 1 is a front elevation of the improved interlocking starter switch mounted on the instrument board of the vehicle, the instrument board being shown in fragment.

Fig. 2 is a vertical sectional view therethrough disclosing the switch parts in their running position.

Fig. 3 is a similar view disclosing the switch parts in their starting position.

Fig. 4 is a transverse sectional view through the improved switch as disclosed in Fig. 2.

Figure 5:
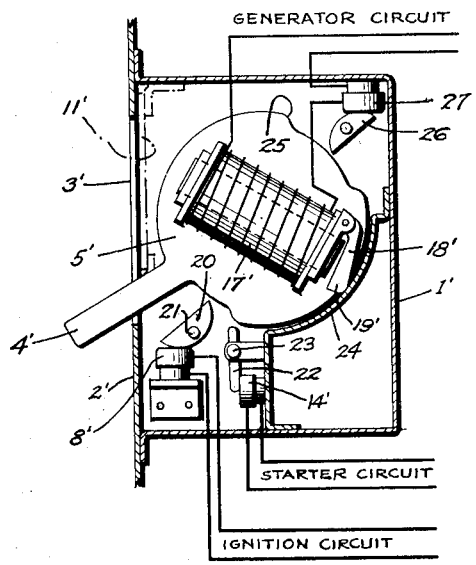
Fig. 5 is a vertical sectional view through the improved switch of a modified embodiment, disclosing the switch parts in their off position.
Figure 6:
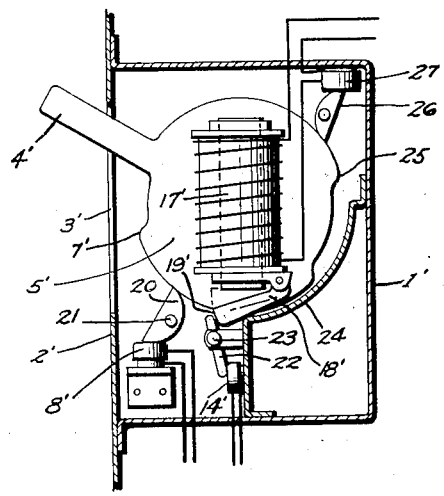
Fig. 6 is a similar view disclosing the parts in their starting position.

Referring more in detail to the accompanying drawings, the numeral 1 designates a supporting housing or switch box adapted for being secured in a convenient position, such as the rear face of the instrument panel 2 the latter being provided with a slot 3 through which the switch handle or knob 4 projects to a position readily accessible to the motorist. A simple embodiment of the control lever is disclosed in Fig. 2 as comprising a bell crank lever 5 fulcrumed in the housing 1 on a stud 6 and having a depending arm or actuating projection 7 engageable with a button or cap 8 to depress the same to a position for closing the circuit, as by bringing the bridge piece 9 down into electrical contact with the contact posts 10, this detailed switch disclosure being made for purposes of illustration alone.

The ignition circuit is closed by the control lever when in both the "running" position and the "starting" position, and is open only when the control lever is moved to the dotted line showing in Fig. 2, the full line showing in said view indicating the working position of the control lever.

When the control lever is in its lowermost or "off" position it may be secured in such position against tampering, if desired, by a lock plate 11 slidably mounted in the housing for being moved across the slot 3 into a lever-obstructing position as by a key-actuated eccentric 12.

When the control lever is moved to its starting position, in addition to retaining the ignition circuit closed it also closes the starting circuit either through a mechanical connection between the lever and the starting switch, as indicated in Fig. 2, or through a relay circuit such as might be closed by the housing-contained starter switch depicted in Figs. 5 through 8, it being well understood in the automotive industry that the manually closed starting switch closes through a relay which in turn closes a starter switch of a much heavier construction, and therefore the term starting switch as used herein will broadly designate any practical means for ordinarily closing the circuit through the starter motor.

Referring back to Figure 2 I have diagrammatically illustrated the starting circuit switch as comprising spaced contacts 13 adapted for being connected by a bridge piece 14, the bridge being connected through mechanical means, such as the link 15, with the arm or part 7. Consequently, when the control lever 5 is swung upwardly to the position indicated in Figure 3 the bridge 14 will move to the position indicated in the latter figure for closing the starter circuit.

As soon as the engine has been started the control lever is moved downwardly to its running position, and to insure of this return or movement to the running position a spring 16 may be incorporated in the construction which will be active only when the control lever is moved beyond the running position. In the illustration this spring does not function during the lever movement between the running and off positions.

With the engine running, the power plant of the motor vehicle is set in operation and the generator of said plant has begun its function in the production of an electric current. This generated current is utilized in the actuation of means which will protect the starter circuit or system against further actuation until the engine has again come to rest.

In the embodiment of the invention disclosed in Figs. 1 through 4 I provide means for arresting the control lever from being moved from the running position to the starting position, while in the embodiment disclosed in Figs. 5, 6, 7 and 8 I provide means for retracting a part from its operative position which part normally would lie disposed in a position to close the starter circuit, the means in either instance thwarting the closure of the starter circuit.

Referring again to Fig. 2, the numeral 17 denotes an electro-magnet whose windings are incorporated in the generator circuit for energizing the same when the generator is in operation. The numeral 18 denotes a combined armature and latch designed for attraction by the solenoid 17. On its outer end of the armature a latch part 19 is carried for being moved into the path of the lever 5, as shown in dotted lines in Fig. 4, so as to obstruct movement of the lever toward a starting position.

Obviously, with the engine running the solenoid is acting to attract its armature and hold the latch part 19 over the lever 5. Any attempt to lift the lever upwardly to its starting position is thereby successfully frustrated and the starter system is protected against injury through accidental unauthorized operation. So long as the engine is running the generator current passes through the solenoid to hold the latch part operative.

Figure 7:
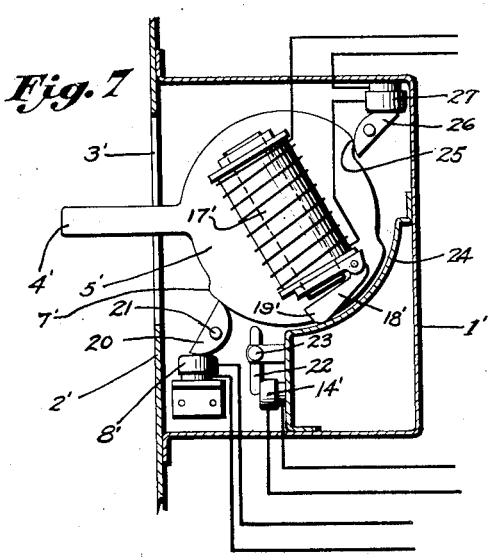
Fig. 7 is a like view depicting the parts in their running position.
Figure 8:
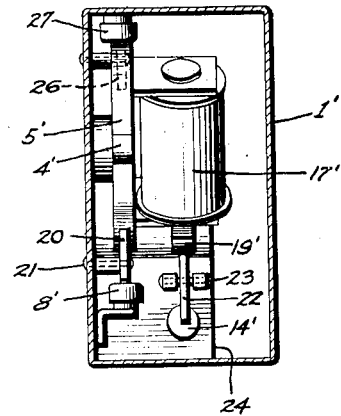
Fig. 8 is a transverse sectional view of the switch with the parts related as shown in Fig. 7.

In the modified construction, I provide a solenoid in which the generator circuit is passed through its windings only when the control lever is attempted to be moved from a running position to a starting position. Referring to Figs. 5, 6, 7 and 8, the numeral 5' denotes the control lever which has the operating handle 4' projecting through the slot 3' of the instrument board 2'. The ignition circuit switch 8' is arranged in the housing 1' and is depressed by a cam part or actuating projection 7' on the lever 5' which is swung or moved from its off position (Fig. 5) to the running position (Fig. 7). This cam part 7' acts indirectly on the ignition switch 8' through an interposed lever 20 pivotally mounted at 21 and arranged with one end in the path of the cam 7' and its opposite end disposed for actuating the switch 8'.

The numeral 14' designates the starter circuit switch adapted to be closed by a lever 22 pivoted at 23 and having an end projecting into the path of a latch or trip part 19' formed on the end of the armature 18'. The switch 14' may be of a light construction and connected in circuit to a relay (not shown) which, in turn, will close a heavier circuit through the starter motor. Such a relay arrangement is well known in automobile manufacture. The solenoid 17' is shown as being carried bodily by the lever 5' and, in turn, carries its armature 18' so that the trip part 19' is moved along with the lever 5'. Therefore, in starting the engine the latch or trip part is moved against the lever 22 to rock it and close the starter switch 14'. A guide plate 24 is arranged alongside of the path of the trip part so as to hold the armature within the magnetic field of its solenoid. Now then, when the engine is running, and the generator circuit is energizing the solenoid 17', the armature 18' is attracted to lift the trip part 19' out of the path of the upper end of the lever 22, as indicated in dotted lines in Fig. 6, whereby the starter circuit switch will fail to close even though the control lever 5' is moved to its apparent starting position.

To avoid the generator current passing continuously through the solenoid 17' I leave the generator circuit open or interrupted and close the circuit only when the control lever 5' is moved from its running position (Fig. 7) to its starting position (Fig. 6), which movement brings a cam shoulder 25 on the lever 5' against one end of a trip lever 26 and rocks its opposite end into operative engagement with the generator circuit switch 27 whereupon the generator circuit is closed, and if the engine is running and the generator creating an electrical current, such current will immediately energize the solenoid 17' and withdraw the trip part 19' from the path of the lever 22 so that the starter circuit switch is not closed as said part 19' passes thereover. A manual lock 11' (Fig. 5) may be provided, as in the case of the control lever of Figs. 1, 2, 3 and 4, if this is desired.

From the foregoing it will be observed that in either form of the invention the starter circuit switch can not be closed while the engine is running and therefore serious consequences to the power plant will be positively avoided and insured against. While the control lever is illustrated on the instrument board it obviously could be disposed on the floor of the vehicle in the customary location, although recent models of automobiles are arranging the starter button on the instrument panel as a matter of preference.

While I have described my invention as applied to the starting circuit of motor vehicles, I do not thereby intend to restrict its use, since obviously it is applicable to the starting of internal combustion engines in general in which sense such term "motor vehicles" has herein been used.

What is claimed is:

1. A control for the ignition circuit of an engine having a generator and for the starting motor for said engine, comprising a switch for the ignition circuit, a switch in circuit with the starting motor, means movable from a normal position to second and third positions in which the means closes the ignition switch, a part carried by said means for closing the starter switch when the means is moved to the third position, and electro-magnetic means in circuit with the generator for rendering said part ineffective to close the starter switch when the engine is running.

2. In association with an engine having a starting motor and a generator, a starting switch in circuit with the starting motor, a control movable from a normal position to a starting position, means movable by the control for closing said starting switch when the control is moved into starting position, electro-magnetic means in circuit with the generator for rendering said first means ineffective to close the starting switch when the engine and generator are running, and means for breaking the circuit between the electro-magnetic means and the generator when the control is moved from said starting position.

CUTHBERT E. REEVES.